United States Patent

[11] 3,542,337

| [72] | Inventor | Domer Scaramucci<br>3245 S. Hattie, Oklahoma City, Oklahoma 73129 |
|---|---|---|
| [21] | Appl. No. | 748,372 |
| [22] | Filed | July 29, 1968 |
| [45] | Patented | Nov. 24, 1970 |

[54] THROTTLING VALVE WITH PROTECTED SEALS
6 Claims, 7 Drawing Figs.

[52] U.S. Cl. ................................................. 251/209,
251/151, 251/315, 251/317
[51] Int. Cl. ..................................................... F16k 5/06
[50] Field of Search .......................................... 251/315,
317, 209, 208, 309, 151

[56] References Cited
UNITED STATES PATENTS

| 2,117,456 | 5/1938 | Schellin | 251/317UX |
| 2,573,238 | 10/1951 | Wunn | 251/283X |
| 2,963,262 | 12/1960 | Shafer | 251/315X |
| 3,173,648 | 3/1965 | McGuire | 251/315X |
| 3,410,461 | 11/1968 | Barker | 251/315X |

FOREIGN PATENTS

| 868,819 | 1/1953 | Germany | 251/309 |
| 922,906 | 12/1954 | Germany | 251/309 |
| 929,407 | 6/1955 | Germany | 251/309 |
| 335,989 | 2/1936 | Italy | 251/309 |

Primary Examiner—M. Cary Nelson
Assistant Examiner—Michael O. Sturm
Attorney—Dunlap, Laney & Hessin ABSTRACT: An improved throttling valve wherein the annular seal means is disposed, with respect to the flow port of the valve member, whereby said annular seal means is protected from the erosive effect of the fluid flow at all times during the movement of the valve member from a position wherein the flow passageway through the throttling valve is fully open to a position closing said flow passageway, thus providing a valve capable of functioning effectively as a throttling valve and capable of providing a positive seal during shutoff or while in the closed position.

Patented Nov. 24, 1970

3,542,337

INVENTOR.
DOMER SCARAMUCCI
BY
Dunlap, Laney & Hessin
ATTORNEYS

INVENTOR.
DOMER SCARAMUCCI

THROTTLING VALVE WITH PROTECTED SEALS

CROSS REFERENCE TO RELATED APPLICATION

Related subject matter is disclosed and claimed in applicant's copending application Ser. No. 547,926 filed May 5, 1966 and entitled Throttling Valve, now abandoned.

BACKGROUND OF THE INVENTION

1. Field of the Invention

This invention relates generally to improved throttling valves. More particularly, but not by way of limitation, this invention relates to an improved valve for controlling the flow of fluid therethrough as well as improved seal means which are protected from the erosive effects of the fluid flow, thereby making the valve capable of effecting a fluid tight seal upon closure of the valve.

2. Description of the Prior Art

Various types of valves have been constructed in the past for throttling or controlling the flow of fluid therethrough. Generally such valves have incorporated some means for reducing the flow passageway through the valve. Usually, the reduction is accomplished by a tapered flow port extending through a plug or ball valve member, by reducing the area of the outlet passageway from the valve as compared to the area of the inlet passageway, or by a combination of the foregoing. While valves constructed in one or more of the aforementioned ways have been reasonably effective in performing the throttling function, none have been effective to provide for the complete and fluid-tight closure of the valves. The difficulty in obtaining closure in throttling valves has been due to erosion on the seals in the valve resulting from the high velocity of fluid flowing therethrough as the area of the flow passageway through the valve is reduced.

SUMMARY OF THE INVENTION

This invention provides an improved throttling valve comprising a valve body having an inlet and outlet openings therein and a valve chamber communicating with said openings. A valve member is rotatably supported in the valve chamber and has a flow port therethrough for controlling the flow of fluid through the valve. A first annular seat is secured in the valve chamber and encircles one of the openings, having an inner periphery shaped to mate with the respective end of said flow port when the valve member is in the open position and a wear-resistant seating surface surrounding the inner periphery shaped to mate with the outer surface of the valve member. A first annular seal is carried in the seating surface of the seat in a position to seal against the valve member when the valve is closed. The seal is positioned sufficiently remote from said inner periphery to not be uncovered by the valve member port end until no portion of the port end registers with the inner periphery of the seat during opening and closure of the valve, whereby the seal will not be contacted by the fluid flowing through the valve.

One object of the invention is to provide an improved throttling valve.

Another object of the invention is to provide an improved throttling valve constructed to protect the seals from the erosive effects of the fluid flow, thus providing for the complete fluid-tight closure of the valve when the valve member is in the position closing the flow passageway through the valve.

A further object of the invention is to provide an improved ball valve capable of effectively throttling fluid flow therethrough.

Still another object of the invention is to provide an improved ball valve that effectively throttles and yet provides for a fluid-tight closure of the valve.

A still further object of the invention is to provide an improved throttling valve economical in construction and operation.

Other objects and advantages of the invention will be evident from the following detailed description when read in conjunction with the accompanying drawings which illustrate various embodiments of the invention.

DESCRIPTION OF THE PREFERRED EMBODIMENT

Figure 1:
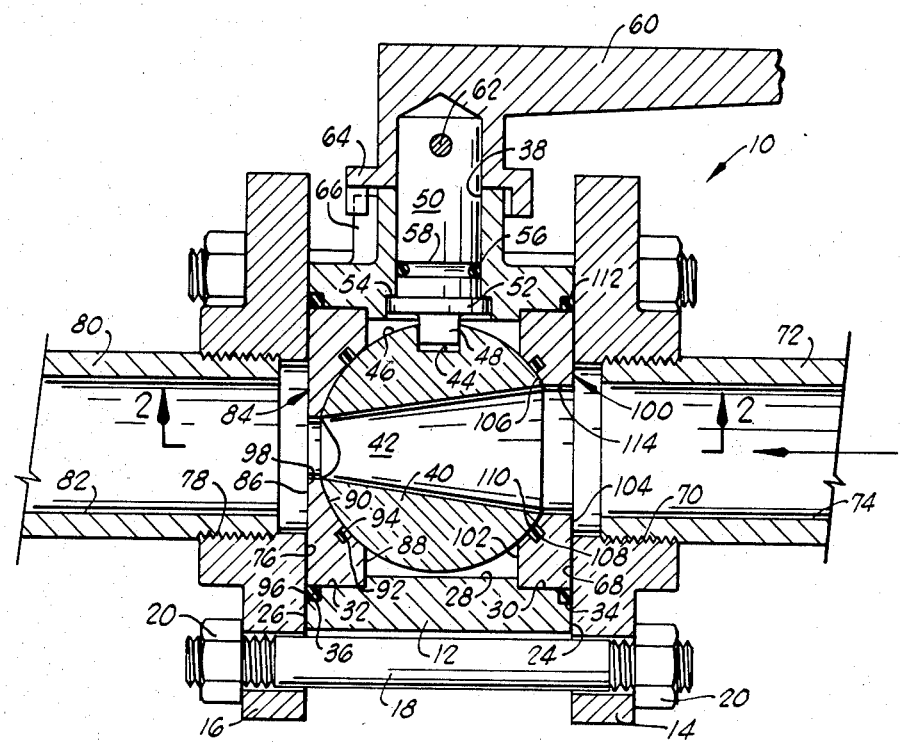
FIG. 1 is a vertical cross-sectional view of a ball valve constructed in accordance with the invention.

Referring to the drawings, and to FIG. 1 in particular, shown therein and generally designated by the reference character 10 is a ball valve constructed in accordance with the invention. As shown therein, the ball valve 10 includes a valve body 12 disposed between flanges 14 and 16. The valve body 12 and flanges 14 and 16 are held in assembled relation by a plurality of threaded bolts 18 that extend through the flanges 14 and 16. The bolts are provided with threaded nuts 20 in engagement with flanges 14 and 16.

The valve body 12 includes an upstream end face 24, a downstream end face 26, and a bore 28 that extends therethrough intersecting the end faces 24 and 26. Counterbores 30 and 32 are formed in the bore 28 of valve body 12 adjacent the end faces 24 and 26, respectively. Second counterbores 34 and 36 are formed within a portion of the counterbores 30 and 32 respectively, and are adjacent the end faces 24 and 26. An aperture 38 extends transversely through valve body 12 intersecting bore 28 for purposes that will become more apparent hereinafter.

A spherical valve member, that is, a valve ball 40, is movably disposed in the bore 28 of valve body 12. The valve ball 40 has a tapered port 42 extending therethrough and has a rectangular recess 44 formed in the exterior surface 46 thereof. The exterior recess 44 is sized to receive a rectangular end 48 formed on the lower most end portion of valve stem 50. The recess 44 is longer than the end 48 to permit movement of the valve ball 40 in a direction parallel to the bore 28 when the valve ball 40 is in the closed position.

The valve stem 50 extends through the transversely extending aperture 38. In addition to the rectangular end 48, the valve stem 50 includes an exterior flange 52 that engages a downwardly facing surface 54 in valve body 12 encircling the aperture 38 to limit the upward movement of the valve stem 50 in the aperture 38. An O-ring seal 56 is disposed in an annular recess 58 formed in the valve stem 50 and is arranged to provide a fluid-tight seal between the valve body 12 and the valve stem 50 in aperture 38.

A handle 60 is connected with the upper end of the valve stem 50 by a pin 62. The handle 60 includes a lug portion 64 that is engagable with a pair of abutments 66 (only one is shown in FIG. 1) to limit the rotational movement of the handle 60 and interconnected valve ball 40 to approximately 90°.

The flange 14 also includes an end face 68 and a threaded opening 70 that extends therethrough. The threaded opening 70 is sized and arranged to receive the threaded end of conduit 72 having an inner surface 74 therein. The opening 70 is, as shown in FIG. 1, axially alined with the bore 28 extending through the valve body 12.

The flange 16 includes an end face 76 and a threaded opening 78 that extends therethrough. The threaded opening 78 is sized and arranged to receive the threaded end of a conduit 80 having an inner surface 82 therein. The opening 78 is also axially alined with the bore 28 of valve body 12.

From the above it will be observed that the flange 14 effectively forms an inlet opening for the valve body 12 and the flange 16 effectively forms a downstream opening for the valve body 12.

An annular downstream seat designated by the general reference character 84 is disposed in counterbore 32 formed in valve body 12. The seat 84 has an outer end 86 which is adjacent end 76 of flange 16 and an inner end 88. A seating surface 90 is formed on a portion of the inner end 88 of seat 84. The surface 90 of seat 84 basically conforms to the exterior surface 46 of valve member 40 and maintains sliding and seating engagement with said surface. An annular groove 92 is formed in surface 90 of seat 84. An annular seal member 94 is disposed in annular groove 92 to maintain sealing contact with the exterior surface 46 of valve member 40. The location of annular seal member 94 in annular groove 92 with respect to the tapered flowport 42 of valve member 40 will be defined more specifically in the discussion of the operation of valve 10 hereinafter. The seat 84 is sized to slidingly fit in counterbore 32 and an annular seal member 96 is disposed in counterbore 36 to provide a seal between seat 84 and the valve body 12, as well as sealingly contact end surface 76 of flange 16.

The inner periphery 98 of seat 84 is shaped to basically conform to the downstream opening of flow port 42 of valve member 40. In the preferred embodiment the seat 84 is constructed from an erosion resistant material.

An annular upstream seat designated by the general reference character 100, is disposed in counterbore 30 of valve body 12. The annular upstream seat 100 is constructed similar to the annular downstream seat 84, previously described, and includes an inner end 102 and an outer end 104 which is adjacent end face 68 of flange 14. The seating surface 106 is formed on the inner end 102 and basically conforms to the exterior surface 46 of valve member 40 and maintains sliding and seating contact therewith.

An annular groove 108 is provided in surface 106 of seat 100. An annular seal member 110 is disposed in annular groove 108 to maintain sealing contact with the exterior surface 46 of valve member 40. The seat 100 is sized to slidingly fit in counterbore 30, and an annular seal member 112 is disposed in counterbore 34 to provide a seal between seat 100 and the valve body 12, as well as sealingly contact end surface 68 of flange 14. The inner periphery 114 of seat 100 basically conforms to the shape of the upstream opening of flow port 42 of valve member 40.

As shown in FIG. 1, the valve member 40 has been rotated by turning operating handle 60 to the open position. In the open position, the flow passageway through the valve 10 is defined by the inner surface 74 of conduit 72, the inner periphery 114 of seat 100, the flow port 42 of valve member 40, the inner periphery 98 of seat 84, and the inner surface 82 of conduit 80.

OPERATION OF FIGURE 1

Figures 2, 3:
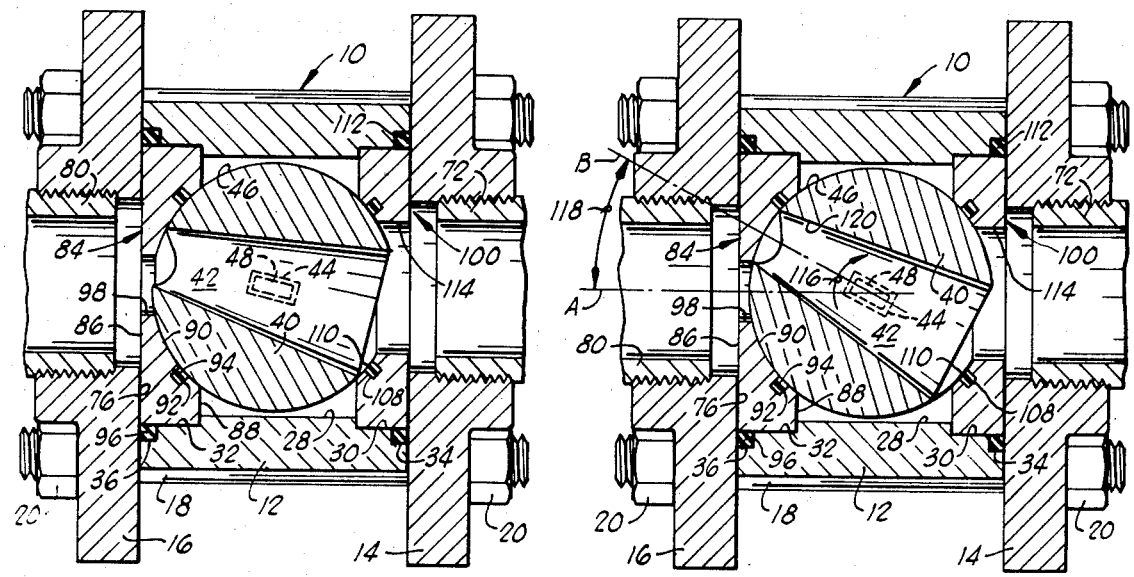
FIG. 2 is a fragmentary cross-sectional view of the valve of FIG. 1 taken substantially along the line 2–2 of FIG. 1, but showing the valve member rotated to a throttling position.
FIG. 3 is a fragmentary cross-sectional view similar to FIG. 2, but illustrating the valve member rotated further to a point immediately subsequent to closure of the flow passageway through the valve.

As shown in FIG. 1, the valve 10 is positioned with the valve member 40 axially alined with the inlet and outlet openings defined by the inner peripheries 98 and 114 of seats 84 and 100, respectively, in valve 10. With the valve member in this position, the throttling effect produced by the valve 10 is due to the tapered configuration of the flow port 42. When a greater throttling effect is desired, the handle 60 is turned until the valve member 40 assumes the position substantially as illustrated in FIG. 2. As shown therein, the throttling effect is produced both by the tapered configuration of the flow port 42 of valve member 40 and by a portion of the inner periphery 98 of the seat 84. It should be pointed out that the large end of the flow port 42 adjacent seat 100 remains in a substantially open or full flow position with respect to fluid entering the flow port 42 of valve member 40 adjacent seat 100.

Fluid flowing through the flow port 42 of valve member 40 encounters the reduced area of both the tapered flow port 42 and the inner periphery 98 of seat 84. Manifestly, a velocity increase occurs at a position adjacent the seat 84, but not in the inlet end or large end of the flow port 42, adjacent seat 100. Thus, any erosion occuring in the valve 10 as a result of the increased fluid velocity due to the throttling effect is located adjacent seat 84 and is essentially eliminated from the seat 100.

As shown in FIG. 3, the valve member 40 has been further rotated in a circular direction of rotation 116 to a point, just beyond which the fluid will flow through the flow passageway of valve 10. It may be observed, that the downstream end of the flow port 42 adjacent seat 84 is completely closed by the surface 90 of seat 84, thereby preventing the flow of fluid from the upstream end of valve 10 to the downstream end of valve 10, or rather closing the flow passageway through the valve.

As shown in FIG. 3, the axis A is a line extending through the center of flow port 42 of valve member 40, with the valve member 40 in the open position, as previously described and shown in FIG. 1. The axis generally designated by the letter B, is in a line drawn through the center of flow port 42 of valve member 40, with the valve member 40 rotated to the position shown in FIG. 3. In this position the axis A and the axis B define an angle 118, which is known as the throttling range angle and as indicated from the foregoing discussion may be defined as, that angle through which valve member 40 may be rotated from a fully open position to a position immediately subsequent to closure of the flow passageway.

It may be observed in FIG. 3 that the annular seal member 94 which is disposed in annular groove 92 of seat 84 is located, with respect to flow port 42 of valve member 40, beyond upper surface 120 of flow port 42 of valve member 40 in the direction of rotation 116. It is apparent from the foregoing that the annular seal member 94 of seat 84 remains protected from the erosive effect of the fluid flow by the surface 46 of valve member 40 throughout the rotation of valve member 40 through the entire throttling range angle 118 of valve 10. The annular seal member 94 of seat 84 will thus, be able to provide an effective fluid-tight seal, virtually unaffected by the erosive effects of the fluid flow.

When the valve member 40 is moved further to the closed position, (not shown) that is, to the position wherein the center line axis of flow port 42 of valve member 40 is substantially perpendicular to axis A, shown in FIG. 3, the seat 100, which is responsive to fluid pressure in the inlet opening of valve 10, will provide a portion of the sealing. Thus, the seat 100 will move along counterbore 30 in body 12 to maintain the annular seal member 110 of seat 100 in sealing engagement with the exterior surface 46 of valve member 40. The annular seal member 94 of seat 84 will also remain in sealing contact with the exterior surface 46 of valve member 40. Thus, it may be seen that the valve 10, not only provides for the desired throttling with minimum wear of the annular seal means but also provides a fluid-tight seal upon closure of the valve.

EMBODIMENT OF FIGURE 4

Figure 4:
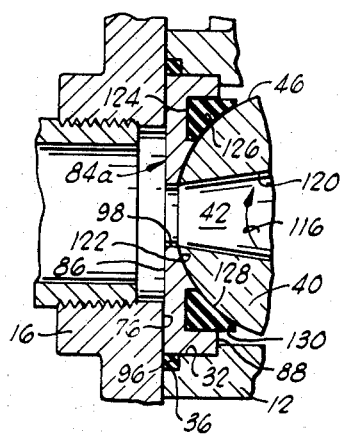
FIG. 4 is a fragmentary cross section of the valve shown in FIG. 1, but illustrating a different embodiment of the annular member.

FIG. 4 illustrates another embodiment of an annular downstream seat, designated by the general reference character 84A, which may be utilized in the valve 10 of FIG. 1 and is constructed in accordance with the invention. With the exception of the annular seal members, the annular downstream seat 84A is constructed and operates exactly like annular downstream seat 84 of valve 10 in FIG. 1.

The annular downstream seat 84A is slidingly disposed in counterbore 32 of valve body 12 and the annular seal member 96 is disposed in counterbore 36 of valve body 12 to maintain sealing engagement with the seat 84A and the end face 76 of flange 16. The inner periphery 98 of seat 84A corresponds in shape to the downstream opening of flow port 42 of valve member 40 as similar to that previously described with respect to valve 10 of FIG. 1.

The seat 84A includes an outer end 86 and an inner end 88 and a seating surface 122 which is formed on the inner end 88 of seat 84A. The surface 122 of seat 84A is arranged to receive the exterior surface 46 of valve member 40. An annular slot or groove 124 is provided in surface 122 of seat 84A. As clearly shown in FIG. 4, a resilient annular seal member 126 is disposed in annular slot 122 and encircles a portion of seat 84A. The annular seal member 126 is preferably bonded to the walls of the groove 124 and includes a surface 128 thereon that is arranged to sealingly engage the exterior surface 46 of valve member 40. The seal 126 also includes a portion 130 protruding into the valve chamber formed by the bore 28 beyond the inner end 88 of the seat 84A.

OPERATION OF THE EMBODIMENT OF FIGURE 4

Operationally, the valve 10 constructed using the seat 84A, will function in a manner very similar to the previously described valve 10 and seat 84. In fact, the throttling function of the valve 10 is precisely as previously described in connection with the embodiment of FIG. 1. It will be noted that the primary distinction between the embodiment of valve 10 shown in FIG. 1 and that shown in FIG. 4 is the construction of annular seal member 126.

The annular seal member 126 of seat 84A is located with respect to flow port 42 of valve member 40 to be beyond, in the direction of rotation 116, the upper surface 120 of flow port 42 of valve member 40. It may be observed, therefore, that the annular seal member 126 of seat 84A will remain protected from the erosive effects of the fluid flow throughout the rotation of valve member 40 through the entire throttling range angle (not shown), exactly as described in connection with annular seal member 94 of seat 84 in FIGS. 1, 2 and 3. The annular seal member 126, undamaged by the erosive effects of the fluid flow, will, therefore, be able to provide an effective fluid-tight seal when the valve member 40 is rotated to the closed position (not shown), as previously described.

The annular seal member 126 of seat 84A is in sealing engagement with the exterior surface 46 of the valve member 40 and, therefore, will be effective to provide a fluid-tight downstream closure of the valve 10. In the event that the seat 84A has been eroded sufficiently to permit movement of the valve member 40 away from the seat 100, shown in FIG. 1, 2, and 3, it can be appreciated from viewing FIG. 4 that the annular seal member 126 will remain in sealing engagement with the valve member 40 and, thus, still provide an effective fluid-tight seal on shutoff or closure of the valve 10. It is also obvious from viewing FIG. 4, that the annular seal member 126 is basically a pressure responsive type seal. That is, as the fluid pressure in the valve body 10 increases, the force of the sealing engagement between annular seal member 126 and the exterior surface 46 of valve member 40 will increase proportionately.

EMBODIMENT OF FIGURE 5

Figure 5:
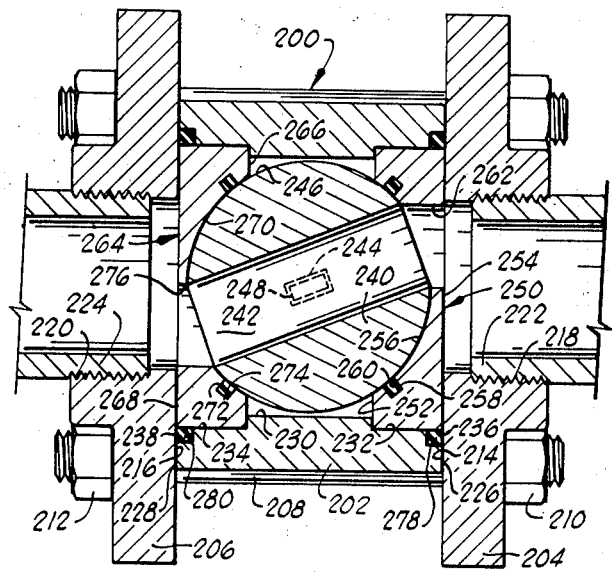
FIG. 5 is a cross-sectional view similar to FIG. 2, but illustrating still another embodiment of a valve constructed in accordance with the invention.

FIG. 5 illustrates another embodiment of a valve generally designed by reference character 200 and constructed in accordance with the invention. The valve 200 is constructed similar to valve 10 shown in FIG. 1 and the cross-sectional view of valve 200 in FIG. 5 is similar to the cross-sectional view of valve 10 shown in FIGS. 2 and 3. As shown in FIG. 5, the valve 200 comprises a valve body 202 disposed between flanges 204 and 206.

The valve body 202 and the flanges 204 and 206 are held in assembled relation in a manner similar to that previously described with respect to valve 10 in FIG. 1 and by means of a plurality of threaded bolts 208 that extend through the flanges 204 and 206 and threaded nuts 210 and 212 that engage flanges 204 and 206, respectively.

The flanges 204 and 206 are constructed similar to flanges 14 and 16 of FIG. 1 and include end faces 214 and 216, respectively, and threaded openings 218 and 220 sized and arranged to receive the threaded end of conduits 222 and 224, respectively.

The valve body 202 is constructed similar to valve body 12 of valve 10 in FIG. 1 and includes opposite end faces 226 and 228, and a bore 230 that extends therethrough intersecting said opposite end faces 226 and 228. Counter bores 232 and 234 are formed in the bore 230 of valve body 202 adjacent end faces 226 and 228, respectively. Additional counterbores 236 and 238 are formed within a portion of the counterbores 232 and 234 and are adjacent end faces 226 and 228, respectively.

A valve member 240 is disposed in bore 230 of valve body 202. The valve member 240 has a flow port 242 extending therethrough. It may be observed in FIG. 5 that the flow port 242 is disposed at an angle to the axis of the openings provided by the threaded ends of conduit 222 and 224, when the valve 200 is in the open position, the reason for which will be described hereinafter. It is to be understood that the valve 200 is provided with the necessary operating components such as a valve stem and handle similar to that previously described for valve 10 of FIG. 1. In FIG. 5 the recess 244 in the surface 246 of valve member 240 is provided to receive a rectangular end 248 of the valve stem (not shown), both of which are constructed and operate exactly as end 48 and recess 44 of valve 10 in FIG. 1, to rotate valve member 240 from an open position, (shown in FIG. 5) to a fully closed position (not shown).

An annular seat member designated by the general reference 250 is disposed in counterbore 232 of valve body 202 and is sized to provide a sliding fit therein. The seat 250 is constructed similar to seats 84 and 100 of valve 10 in FIG. 1 and includes an inner end 252; an outer end 254; a seating surface 256 formed on a portion of inner end 252 which basically conforms to the exterior surface 246 of valve member 240 and maintains sliding and seating contact therewith; an annular groove 258 in surface 256; an annular seal member 260 disposed in annular groove 258 in sealing contact with surface 246 of valve member 240, and an inner periphery 262.

A second annular seat member designated by the general reference character 264 is disposed in counterbore 234 of valve body 202 and is sized to provide a sliding fit therewith. The seat 264 is constructed similar to seat 250 and also includes an inner end 266; an outer end 268; a seating surface 270 formed on a portion of inner end 266 which basically conforms to the exterior surface 246 of valve member 240 and maintains sliding and seating contact therewith; an annular groove 272 in surface 270; an annular seal member 274 disposed in annular groove 272 in sealing contact with surface 246 of valve member 240, and an inner periphery 276.

The inner periphery 262 of seat 250 is shaped to basically conform to the angled shape of the adjacent end of flow port 242 of valve member 240. The inner periphery 276 of seat 264 is shaped to basically conform to the angled shape of the adjacent end of flow port 242 of valve member 240. It may be observed in FIG. 5 that the inner peripheries 262 and 276 provide openings in seats 250 and 262 respectively which are offset from the centers of said annular members. The reason for the offset will be fully explained hereinafter.

An annular seal member 278 is disposed in counterbore 236 to provide a seal between seat 250 and the valve body 202, as well as sealingly contact end surface 214 of flange 204. A second annular seal member 280 is disposed in counterbore 238 to provide a seal between seat 264 and the valve body 202, as well as sealingly contact end surface 216 of flange 206.

OPERATION OF FIGURE 5

As observed in FIG. 5, the valve member 240 of valve 200 is in the open position, that is, with the open ends of flow port 242 of valve member 240 mating with the inner peripheries 262 and 276 of seats 250 and 264, respectively. With the valve member 240 in this position, and assuming further that the end areas of flow port 242 of valve member 240 are equal, naturally, no throttling effect of the fluid flow will occur. When a throttling effect is desired, the valve member 240, is rotated in a manner similar to that previously described for valve 10 in FIG. 1, and in a direction of rotation 282, to a throttling position shown in FIG. 6.

Figure 6:
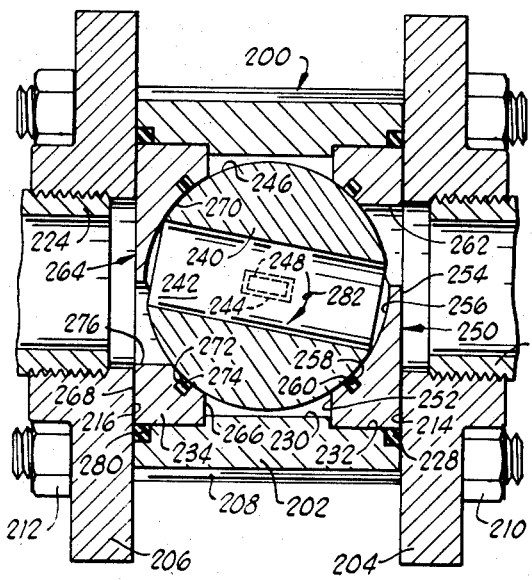
FIG. 6 is a fragmentary view of the valve of FIG. 5 but showing the valve member rotated to a throttling position.

It may be observed in FIG. 6 that the area of the flow passageway at either end of flow port 242 of valve member 240 adjacent the seats 250 and 264 has been reduced. This restriction or reduction of the flow passageway area will result in an increase in the velocity of the fluid flow similar to that previously described in valve 10 of FIG. 1. The increase in the velocity of the fluid flow will result in an erosion or erosive effect on surfaces 256 and 270 adjacent inner peripheries 262 and 276 of seats 250 and 264, respectively. It may be observed that the annular seal members 260 and 274 are protected from the erosive effect of the fluid flow when the valve member 240 of valve 200 is in the throttling position shown in FIG. 6, similar to the protection afforded and described of annular seal member 94 of valve 10 in FIG. 2. It will be observed from the foregoing that erosion due to the velocity of the fluid flow will occur at both ends of flow port 242 of valve member 240, whereas in valve 10 of FIG. 1 the erosive effect of the fluid flow was concentrated on one end of the flow port 42 of valve 10. The offset between the openings provided by the inner peripheries 262 and 276 of seats 250 and 264 respectively, is thus provided so that the seal members 260 and 274 of seats 250 and 264, respectively, are both afforded protection from the erosive effects of the fluid flow when the valve member 240 of valve 200 has been rotated to the throttling position shown in FIG. 6.

Figure 7:
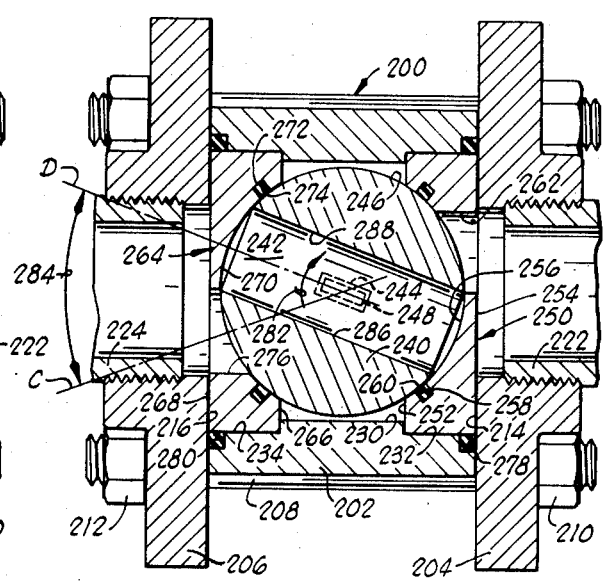
FIG. 7 is a view similar to FIG. 6, but illustrating the valve member rotated further to a point immediately subsequent to closure of the flow passageway through the valve.

In FIG. 7, the valve member 240 of valve 200 has been further rotated in a direction 282 to a position, just beyond which fluid will flow through the flow passageway of valve 200. The axis designated by the letter C in FIG. 7 is essentially a line which has been drawn through the center of flow port 242 of valve member 240, when the valve member 240 is in open position as shown in FIG. 5. The axis designated by the letter D in FIG. 7 is essentially a line drawn through the center of flow port 242 of valve member 240 when the valve member has been rotated to the closed position of FIG. 7. The intersection of axis C and axis D forms or defines an angle 284 which is referred to as the throttling range angle. The throttling range angle 284 of valve 200 is similar to the throttling range angle 118 of valve 10 and is defined as that angle through which the valve member 240 of valve 200 may be rotated from full open position to immediately subsequent to closure of the flow passageway through the valve 200.

The location of annular seal member 260 may be observed in FIG. 7, to be beyond (in the direction of rotation 282), the lower surface 286 of flow port 242 when the valve member 240 of valve 200 has been rotated through the throttling range angle 284. The seal member 260 is thereby protected from the erosive effects of the fluid flow throughout the rotation of valve member 240 of valve 200 through the entire throttling range angle 284. The seal member 260 of seat 250, undamaged by the erosive effects of the fluid flow, is thus able to provide an effective fluid tight seal when the valve 200 is rotated to the closed position (not shown), that is, where the axis of the center line of flow port 242 of valve member 240 is substantially perpendicular to counterbore 230 of valve body 202.

The annular seal member 274 of seat 264 is located beyond (in the direction of rotation 282) the upper surface 288 of flow port 242 when the valve member 240 of valve 200 has been rotated through the throttling range angle 284, and is thereby protected from the erosive effects of the fluid flow in a manner similar to that described with respect to annular seal member 260 of seat 250.

The seats 250 and 264 will function exactly like annular members 84 and 100 of valve 10 of FIG. 1, to maintain sealing contact between the annular seal members 260 and 274 of seats 250 and 264, respectively, and the surface 246 of valve member 240 when the valve member 240 of valve 200 has been rotated to the closed position.

It should be apparent from the foregoing that for economy and simplicity of manufacture the seats 250 and 264 of valve 200 may be identical in construction with the offset centers accomplished by proper orientation of the seats 250 and 264 in their respective counterbores 232 and 234.

It should be also apparent from the foregoing that each of the valve members and annular members described are to be constructed from or treated with suitable erosion resistant materials. Thus, the valves are suitable for extended service under throttling conditions.

The various embodiments of the throttling valves described in detail hereinbefore have been described assuming the fluid flow in a particular direction for the convenience and clarity of description, but it is apparent that the flow could be in either direction. The valve members have been described as being of the ball type construction and it is equally apparent that they could be of different types of construction and remain within the scope of the invention.

It should be understood that the embodiments described in detail hereinbefore are presented by way of example only and that many changes and modifications can be made thereto without departing from the spirit of the invention or from the scope of the annexed claims.

I claim:

1. A throttling valve, comprising:
    a body having inlet and outlet openings therein and a valve chamber communicating with said openings;
    a valve member rotatably supported in the valve chamber and having a flow port therethrough for controlling the flow of fluid through the valve, wherein the flow port is tapered from a larger diameter at the inlet end of the valve to a smaller diameter at the outlet end of the valve when the valve member is in a fully open position;
    an annular seat secured in the valve chamber encircling the outlet opening having an inner periphery shaped to mate with the respective end of said flow port when the valve member is in an open position, and having a wear-resistant seating surface surrounding said inner periphery shaped to mate with the outer surface of the valve member; and
    an annular seal carried in the seating surface of the seat in a position to seal against the valve member when the valve is closed, said seal being positioned sufficiently remote from said inner periphery to not be uncovered by said port end until no portion of said port end registers with the inner periphery of said seat during opening and closing of the valve, whereby said seal will not be contacted by fluid flowing through the valve.

2. A throttling valve as defined in claim 1 wherein the valve member is a ball.

3. A throttling valve as defined in claim 1 wherein the annular seal is positioned in a medial portion of said seating surface.

4. A throttling valve as defined in claim 1 wherein the annular seal is positioned at the outer periphery of said seating surface and is exposed to pressure in the valve chamber.

5. A throttling valve as defined in claim 1 characterized further to include:
    a second annular seat encircling the other of said openings having an inner periphery shaped to mate with the respective end of said flow port when the valve member is in an open position; and
    an annular seal carried by the second annular seat in a position to sealingly engage the valve member when the valve member is in a closed position.

6. A throttling valve, comprising:
    a body having alined inlet and outlet openings therein and a valve chamber communicating with said openings;
    a ball valve member rotatably supported in the valve chamber and having a flow port therethrough of uniform diameter throughout its length for controlling the flow of fluid through the valve, said flow port having a diameter less than the diameters of the inlet and outlet openings and being arranged to extend at an angle to the inlet and outlet openings when the valve is in a fully open position;

an annular seat secured in the valve chamber around each of the inlet and outlet openings having an inner periphery shaped to mate with the respective end of said flow port when the valve member is in an open position, the centerline of each of said seats being offset from the centerlines of the inlet and outlet openings, and each of said seats having a wear resistant seating surface surrounding the inner periphery of the respective seat shaped to mate with the outer surface of the valve member; and an annular seal carried in the seating surface of each seat in a position to seal against the valve member when the valve is closed, each of said seals being positioned sufficiently remote from the inner periphery of the respective seat to not be uncovered by the respective end of said flow port until no portion of the respective end of said flow port registers with the inner periphery of the respective seat during the opening and closing of the valve, whereby said seals will not be contacted by fluid flowing through the valve.